United States Patent [19]

Maes

[11] 3,725,545

[45] Apr. 3, 1973

[54] ENHANCEMENT OF ANTIBODY PRODUCTION BY NUCLEIC ACID-POLYCATION COMPLEXES

[76] Inventor: Roland Maes, C.P.F.A., Caixa Postal 589-ZC-00, Rio De Janeiro, Brazil

[22] Filed: Feb. 3, 1971

[21] Appl. No.: 112,372

[52] U.S. Cl. ............................424/180, 424/85, 424/88
[51] Int. Cl. ....................................................C12r 5/00
[58] Field of Search............................424/180, 85, 88

[56] References Cited

OTHER PUBLICATIONS

Dianzani et al., P.S.E.B.M., Vol. 128, pp. 708–710, July 1968
Woodhour et al., P.S.E.B.M., Vol. 131, pp. 809–817, July 1969

*Primary Examiner*—Richard L. Huff
*Attorney*—Emory L. Groff and Emory L. Groff, Jr.

[57] ABSTRACT

Complex substances capable of enhancing the production of antibodies when introduced in conjunction with an antigen into an animal host are produced by reacting single-stranded or multi-stranded nucleic acid polymers with cationically charged polymers having a molecular weight between about $10^3$ and $10^8$ in specified proportions, e.g., 50 parts of nucleic acid polymer to 1 part to 500 parts cationic polymer by weight.

8 Claims, 1 Drawing Figure

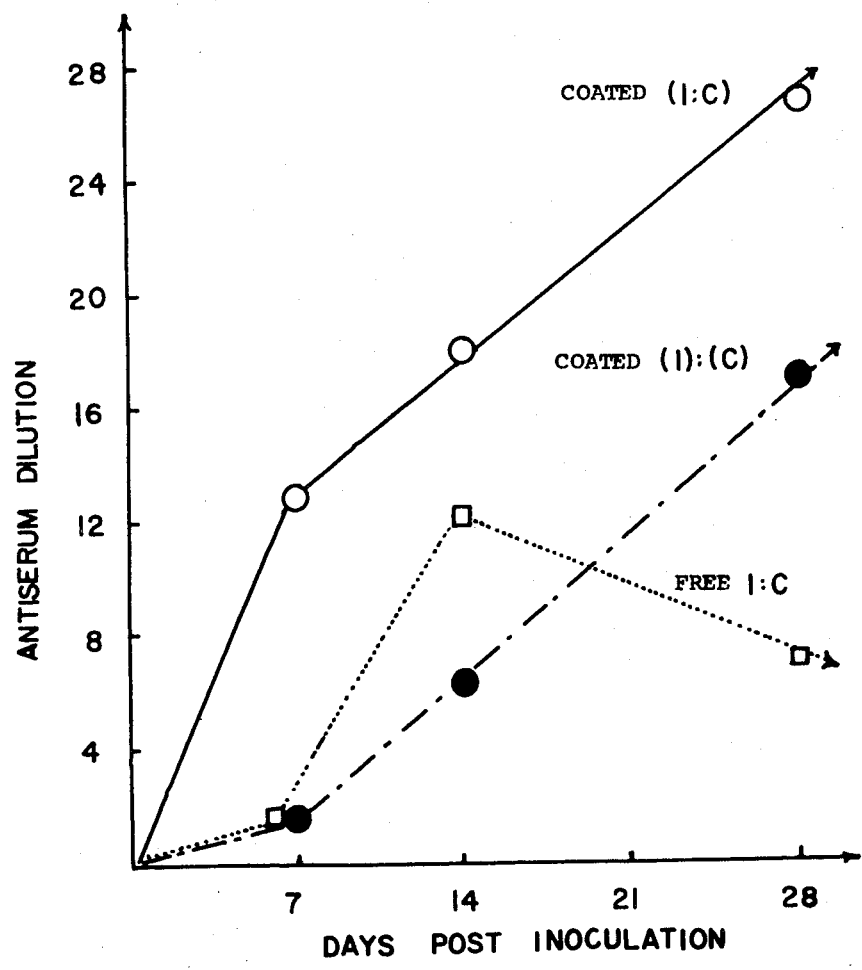
TIME SEQUENCE OF ANTIBODIES PRODUCTION BY 10 MICROGRS OF (I:C)+DEAE-D, (DEAE-D+I):(DEAE-D+C) AND I:C.

ENHANCEMENT OF ANTIBODY PRODUCTION BY NUCLEIC ACID-POLYCATION COMPLEXES

This invention is an improvement on the invention described in my copending patent application, U.S. Ser. No. 848,959, filed Aug. 11, 1969, now U.S. Pat. No. 3,679,654, the disclosure of which is incorporated herein, by reference. That application teaches that complex substances capable of provoking the release or formation of interferon or viral inhibitory proteins when introduced into a host are produced by reacting single-stranded or multi-stranded nucleic acid polymers with cationically charged polymers having a molecular weight between about $10^3$ and $10^8$ in specified proportions, e.g., 10 parts of nucleic acid polymer to 1 part to 100 parts cationic polymer by weight.

The present invention relates to products capable of enhancing the formation of antibodies by animals inoculated with an antigen. It has been established that living animals are provided with a humoral defense mechanism against invading pathogenic microorganisms, or poisons, and will produce proteins, called antibodies, capable of neutralizing the pathogen. The foreign material against which antibodies are formed is an antigen.

Prophylactic and therapeutic measures taken against pathogens such as snake venoms, viruses and bacteria are usually based on this defense mechanism; inactivated or less active pathogens, e.g., antigens, are inoculated into animals, that will produce antibodies capable to neutralize subsequently active invading pathogens of the same nature.

In order to potentiate the production of antibodies, the antigens are usually inoculated in the presence of adjuvants; vaccines are prepared by precipitating or absorbing the antigens on aluminum hydroxide or hydrated aluminum phosphate, or by incorporating them within a water-in-oil emulsion or sodium alginate gels. These adjuvants have only weak enhancing powers or produce abscesses at the site of inoculation.

Single-stranded or double-stranded nucleic acids of natural origin or made of polyribonucleotides of cystosine and hypoxanthine, or adenine and uracil (by the nomenclature of Inman and Baldwin, J. Mol. Biol. 5,172, 1962) are effective in causing the formation of antibodies in animals inoculated with an antigen. As described in the above-noted earlier filed application Ser. No. 848,959, the possibility was contemplated by the applicant to enhance this action by increasing the complexity of the inducer molecule by incorporating a third polymer capable of binding to the free phosphate groups of, or the reactive sites of these groups, that are part of single-stranded, double-stranded, or multi-stranded nucleic acids. That invention is based on the interaction between polycationic substances such as diethyl-amino-ethyl-dextran (DEAE-Dextran) with polymers of nucleic acids. DEAE-Dextran is a polymer of DEAE-glucose of molecular weight between $10^3$ and $10^8$, preferably from $10^4$ to $10^7$, cationically charged, that is, having sites of electrically positive charges. Such polycations have the capacity to bind to negatively charged reactive sites, particularly to bind to free phosphoric acid groups of nucleic acids of single, double, or more complex strands.

Starting with single-stranded nucleic acid polymers, these are dissolved in an aqueous ionic solution containing salts of sodium, potassium, or others, at a pH from 4.00 to 10.00, preferably close to 7.0 to 7.2, buffered by Tris-HCl and maintained at a temperature not exceeding 20° C. Tris is the designation for the reagent Tris(hydroxy-methyl-amino)-ethane.

DEAE-Dextran is produced as an aqueous solution in a concentration of 20 mg/ml. In general, in order to effect the reaction, it is convenient to dilute the nucleic acid polymer to a concentration of 100 to 200 micrograms/ml by incorporation of a solution of NaCl (0.15 molar) and Tris-HCl (0.02 molar), ph 7.0 or other corresponding buffer, working a temperature between 0° C. and 90° C., preferably between 20° C. and 60° C. The temperature should not be permitted to exceed 90° C. because heating the materials excessively destroys the nucleic acid complexes. When higher concentrations of nucleic acid are desired (up to 1 mg/ml), incorporation of a chelating agent such as ethylene diamine tetraacetic acid or citric acid, at a concentration of $10^{-4}$ to $10^{-1}$ molar, preferably 1 to $3 \times 10^{-3}$ molar, is advisable in order to avoid subsequent precipitative effects.

The reaction is carried out by adding a portion of the DEAE-Dextran solution to a portion of the nucleic acid solution, or reversely. Particularly preferred single-stranded nucleic acids are polyinosinic acid (I), polycytidylic acid (C), polyuridylic acid (U), polyadenylic acid (A) and homologues and analogues such as a pyran copolymer and acrylic and methacrylic acid polymers.

After complexing the polycation with each of the single-stranded nucleic acids, a complexing of the two single-stranded polynucleotides into a double-strand is achieved. This is accomplished by mixing the solutions of the two complexed single-stranded nucleic acids, either two complexes formed earlier between polynucleic acid strands and the polycation (DEAE-Dextran or others) can be mixed, or an earlier formed complex between one nucleic acid strand and the polycation can be mixed with a free nucleic acid strand not complexed with a polycation to achieve the desired double-strand.

In addition to complex formation between the free polynucleotides, two other combinations are possible. The first when only one polynucleotide strand (I or C) is first bonded to or coated with DEAE-Dextran, and the second when each of the two polynucleotides are first bonded to DEAE-Dextran.

The formation of antibodies induced by injection of an antigen in conjunction with nucleic acids complexed with a polycation into a host in the manner described is more prolonged than the formation of antibodies as a result of injection of free nucleic acid double-strands, as will be apparent from the results shown in FIG. 1, which shows the time sequence of antibody production when both polynucleotides are bound to DEAE-Dextran, as compared with the results when each single-stranded nucleic acid is separately bonded to DEAE-Dextran and as compared with the free nucleic acids not coated with DEAE-Dextran.

The polynucleotides with the antigen were injected intraperitoneally at a dose of 10 micrograms and the blood analysis was effected 1, 2 and 4 weeks later. It will be seen in FIG. 1 that the adjuvant effect of I:C is highest 2 weeks after the injection of the antigen, and decreases up to the 4th week. With (DEAE–D +

I):(DEAE-D + C), that is (coated I):(coated C), a delaying effect takes place with the maximum antibody production occurring 4 weeks after the administration of the antigen.

In order to obtain an early enhancement of the production of antibodies, instead of a retardation, the nucleic acid and polycation should be complexed in the following way.

First, the double-strand of nucleic acid is formed, and only thereafter can the complexing of this polynucleic acid double strand with the polycation be achieved. The relative proportions of DEAE-Dextran or other polycations necessary to obtain a complex which has markedly greater power to induce antibodies formation is less than that indicated in previously described procedures in which the best results were obtained when equal amounts (W/W) or an excess of polycation was used to complex with single-stranded nucleic acid, so as not to precipitate any part of the complex. The addition of DEAE-Dextran to I:C in relative final proportions (W/W) of 0.01, 0.05, 0.1, 0.2, 0.4, and 1.0 resulted in the formation of a colloid for the four first proportions, a heavy precipitate occurred at 0.4 and the colloidal state was regained at 1.0.

Ten micrograms of I:C were injected with an antigen in mice and compared with the same dose of the complex after its coating with 1:20 (W/W) of its own amount of DEAE-Dextran. Blood analysis was effected 1 to 4 weeks later. It is clear from the data presented in FIG. 1 that the DEAE-Dextran coated polymer is superior to free I:C in inducing the formation of larger amounts of antibodies, up to 4 weeks after the administration of the antigen, and that these antibodies appear earlier in time.

TABLE I
Seroprotection Indices (LOG 10) – 30 Days Post Inoculation

| Vaccines | Control | | | DEAE-D | | | I:C | | | (I:C) | | |
|---|---|---|---|---|---|---|---|---|---|---|---|---|
| | 2 ml. | 6 ml. | Total | 2 ml. | 6 ml. | Total | 2 ml. | 6 ml. | Total | 2 ml. | 6 ml. | Total |
| $C_3$ | 0.54 | 0.77 | 0.65 | 0.81 | 0.23 | 0.52 | 0.85 | 1.36 | 1.10 | 1.37 | 1.87 | 1.59 |
| $O_1$ | 1.40 | 1.43 | 1.42 | 1.00 | 0.87 | 0.93 | 1.62 | 2.97 | 2.28 | 3.15 | 3.56 | 3.35 |
| $A_{24}$ | 2.10 | 2.77 | 2.43 | 1.16 | 1.59 | 1.37 | 2.87 | 4.12 | 3.49 | 4.64 | 4.74 | 4.69 |
| $\bar{X}$ | 1.34 | 1.65 | 1.5 | 0.39 | 0.89 | 0.94 | 1.78 | 2.81 | 2.29 | 3.04 | 3.32 | 3.20 |

TABLE II

| | Quantity (ml.) | Swine No. | VACCINE $C_3$ | | | | VACCINE $O_1$ | | | | VACCINE $A_{24}$ | | |
|---|---|---|---|---|---|---|---|---|---|---|---|---|---|
| | | | Days post inoculation | | | | Days post inoculation | | | | Days post inoculation | | |
| | | | 0 | 15 | 30 | 60 | 0 | 15 | 30 | 60 | 0 | 15 | 30 |
| Control | 6 | 1 | 0.50 | ≤0.75 | ≤0.75 | 0.62 | 0.00 | 0.25 | 1.50 | 0.35 | | | 2.74 |
| | 6 | 2 | 1.10 | ≤0.75 | ≤0.75 | 0.62 | 0.00 | 0.10 | 1.50 | 0.35 | | | 2.89 |
| | 6 | 3 | 0.65 | 1.00 | ≤0.75 | 0.87 | 0.00 | 0.00 | 1.50 | 0.10 | | | 3.34 |
| | 6 | 4 | 0.75 | 1.13 | 0.85 | 0.62 | 0.00 | 0.75 | 1.25 | 0.20 | | | 2.14 |
| | | $\bar{X}$ | 0.75 | 0.90 | 0.77 | 0.68 | 0.00 | 0.27 | 1.43 | 0.25 | | | 2.77 |
| | 2 | 5 | 0.55 | 1.50 | 1.00 | 1.37 | 0.05 | 1.00 | 2.01 | 0.20 | | | 2.24 |
| | 2 | 6 | 0.00 | 0.35 | 0.85 | 1.52 | 0.63 | 0.50 | 1.50 | 0.60 | | | ≤1.99 |
| | 2 | 7 | 0.00 | ≤0.10 | ≤0.10 | 0.62 | 0.14 | 0.50 | ≤1.00 | ≤0.10 | | | 2.09 |
| | 2 | 8 | 0.24 | 0.20 | 0.20 | 0.49 | 0.00 | 0.00 | 1.10 | ≤0.10 | | | 2.09 |
| | | $\bar{X}$ | 0.19 | 0.54 | 0.54 | 1.00 | 0.20 | 0.50 | 1.40 | 0.25 | | | 2.10 |
| | | $\frac{Z\bar{X}}{2}$ | 0.47 | 0.72 | 0.65 | 0.84 | 0.10 | 0.38 | 1.42 | 0.25 | | | 2.43 |
| DEAE-D | 6 | 9 | 0.00 | 0.40 | 0.15 | 0.25 | 0.50 | 0.75 | 0.75 | 0.59 | 0.92 | 1.00 | 2.50 |
| | 6 | 10 | 0.00 | 0.00 | 0.00 | 0.12 | 0.50 | 0.75 | ≤0.50 | 0.72 | 0.67 | 0.65 | ≤0.75 |
| | 6 | 11 | 0.00 | 0.00 | 0.00 | 0.12 | 0.50 | 0.60 | 1.00 | ≤0.34 | 1.65 | 1.55 | ≤0.75 |
| | 6 | 12 | 0.00 | 0.15 | 0.80 | 0.25 | 0.50 | 1.00 | 1.25 | 0.59 | 1.75 | 2.25 | 2.38 |
| | | $\bar{X}$ | 0.00 | 0.13 | 0.23 | 0.18 | 0.50 | 0.77 | 0.87 | 0.56 | 1.25 | 1.34 | 1.59 |
| | 2 | 13 | 0.25 | 1.25 | ≤0.75 | 0.00 | 0.50 | 1.25 | ≤0.50 | ≤0.34 | | | 1.25 |
| | 2 | 14 | 0.75 | 1.25 | 1.00 | 0.25 | 0.75 | 1.00 | 0.75 | 0.59 | | | 1.00 |
| | 2 | 15 | 0.65 | ≤0.75 | ≤0.75 | 0.00 | 0.85 | ≤0.50 | 0.75 | ≤0.34 | | | 1.13 |
| | 2 | 16 | 0.00 | 1.50 | ≤0.75 | 0.00 | 0.25 | 0.75 | 2.00 | 0.84 | | | 1.25 |
| | | $\bar{X}$ | 0.41 | 1.18 | 0.81 | 0.06 | 0.58 | 0.87 | 1.00 | 0.52 | | | 1.16 |
| | | $\frac{Z\bar{X}}{2}$ | 0.20 | 0.65 | 0.52 | 0.12 | 0.54 | 0.82 | 0.93 | 0.54 | | | 1.37 |
| I:C | 6 | 17 | 0.65 | 1.25 | 0.85 | 0.50 | 0.65 | 0.28 | 3.00 | >4.84 | 0.00 | 0.85 | >4.25 |
| | 6 | 18 | 0.75 | 1.25 | 1.25 | 0.35 | 0.00 | 0.40 | 1.50 | 1.34 | 0.00 | 2.56 | >4.25 |
| | 6 | 19 | 0.55 | 1.00 | 1.75 | 0.35 | 0.00 | 3.80 | 3.40 | 3.15 | | | 2.76 |
| | 6 | 20 | 0.25 | 1.25 | 1.62 | 1.25 | 0.00 | 2.28 | >4.00 | >4.84 | | | >5.25 |
| | | $\bar{X}$ | 0.55 | 1.18 | 1.36 | 0.61 | 0.16 | 1.69 | 2.97 | 3.54 | 0.00 | 1.70 | 4.12 |
| | 2 | 21 | 1.00 | 0.85 | 0.85 | 0.25 | 0.00 | 0.00 | 1.40 | 0.84 | | | 3.25 |
| | 2 | 22 | 0.65 | ≤0.75 | 0.85 | 0.39 | 0.00 | 0.65 | >4.00 | >4.84 | | | 4.65 |
| | 2 | 23 | 0.75 | ≤0.75 | 0.85 | 0.15 | 0.00 | 0.40 | ≤0.50 | 0.84 | | | ≤1.75 |
| | 2 | 24 | 0.65 | 1.00 | 0.85 | 0.75 | 0.00 | 0.28 | 0.60 | ≤1.34 | | | 1.85 |
| | | $\bar{X}$ | 0.76 | 0.83 | 0.85 | 0.38 | 0.00 | 0.33 | 1.62 | 1.96 | | | 2.87 |
| | | $\frac{Z\bar{X}}{2}$ | 0.65 | 1.00 | 1.10 | 0.49 | 0.08 | 1.01 | 2.29 | 2.75 | | | 3.49 |

TABLE II—Continued

| Quantity (ml.) | Swine No. | VACCINE $C_3$ Days post inoculation | | | | VACCINE $O_1$ Days post inoculation | | | | VACCINE $A_{24}$ Days post inoculation | | |
|---|---|---|---|---|---|---|---|---|---|---|---|---|
| | | 0 | 15 | 30 | 60 | 0 | 15 | 30 | 60 | 0 | 15 | 30 |
| (I:C) 6 | 25 | 0.35 | 2.45 | 3.31 | 1.42 | 0.00 | 2.90 | >4.50 | >4.60 | | | >5.49 |
| 6 | 26 | 0.00 | 1.20 | 2.60 | 0.72 | 0.00 | 1.50 | 3.75 | 1.20 | | | 5.18 |
| 6 | 27 | 0.00 | 0.20 | 0.35 | 0.97 | 0.60 | 0.60 | 1.25 | 0.97 | 2.00 | 1.40 | >4.15 |
| 6 | 28 | 0.00 | 0.60 | 1.00 | 1.93 | 1.25 | 0.88 | 4.75 | >4.60 | 0.15 | 2.40 | >4.15 |
| | $\bar{X}$ | 0.08 | 1.11 | 1.81 | 1.26 | 0.46 | 1.47 | 3.56 | 2.84 | 1.07 | 1.90 | 4.74 |
| 2 | 29 | 0.00 | 0.35 | ≤0.10 | 0.62 | 0.50 | 0.88 | <1.00 | 0.20 | | | 2.09 |
| 2 | 30 | 0.10 | 0.35 | 1.20 | 1.52 | 0.75 | 0.75 | >4.50 | 4.41 | | | >5.49 |
| 2 | 31 | 0.10 | 0.35 | 2.10 | ≤0.62 | 0.25 | 1.37 | 3.75 | 1.98 | | | >5.49 |
| 2 | 32 | 0.00 | 3.42 | 2.10 | 2.28 | 0.75 | 1.40 | 3.35 | 3.60 | | | >5.49 |
| | $\bar{X}$ | 0.05 | 1.11 | 1.37 | 1.26 | 0.56 | 1.10 | 3.15 | 2.54 | | | 4.64 |
| | $\frac{Z\bar{X}}{2}$ | 0.07 | 1.11 | 1.59 | 1.26 | 0.51 | 1.28 | 3.35 | 2.69 | | | 4.69 |

The latter combination, e.g., (I:C) coated with DEAE-Dextran, is the most promising for practical applications and was tested in commercial water-in-oil emulsion type foot-and-mouth disease vaccines. The vaccines were composed of a virus type $C_3$ antigen, a virus type $O_1$ antigen and additional experiments with a virus type $A_{24}$ antigen were performed also. Two doses of each vaccine were applied; the 6 ml dose contained 600 ug I:C per animal, the 2 ml dose contained 200 ug I:C per animal. A control vaccine (X) containing 600 and 200 ug DEAE-Dextran was included also, to ascertain the lack of enhancement with this polycation alone.

The vaccines were applied to swine. This animal species is known to be difficult to immunize with FMDV vaccines. Table I shows the means of the seroprotection indices obtained 30 days after the inoculation of the vaccines. It is clear that the $C_3$ vaccine was a worse antigen than the $O_1$ vaccine, whereas the $A_{24}$ antigen induced a good antigenic response compared with the control vaccine. The two doses of the control vaccines elicited a similar response. DEAE-Dextran alone incorporated in the vaccines had no enhancing effect. Poly I:C incorporated in the vaccines elicited a better response than the standard control vaccines, especially at the 600 ug dose. Poly I:C coated with 1:20 (W/W) DEAE-Dextran was on the average about 10 times better than I:C alone and the enhancing effect was still very strong at the 200 ug doses. In this case, (I:C) elicited after 30 days in the serum of swine the production of antibodies able to neutralize on the average 1,100 viral particles; with I:C alone this number dropped to 60 and with the control vaccine to 22 viral particles.

Table II shows the totality of the information obtained in this experiment over a period of 60 days. Most interesting was the response obtained with vaccine $C_3$; the control and DEAE-Dextran vaccines elicited a very weak response, the highest index of protection obtained being $10^{1.5}$ (swine Nos. 5, 6 and 16). Poly I:C improved the response somewhat, with swine No. 19 showing, on the 30th day, a seroprotection index of $10^{1.75}$, and swine No. 20 of $10^{1.62}$. At the 200 ug dose, no animal responded satisfactorily. With poly (I:C) incorporated in the vaccine, swine Nos. 25, 26, 28, 31 and 32 all had indices superior to $10^{1.75}$, some of them (Nos. 25, 26, 31 and 32) being excellent.

In the present invention, a maximum production of antibodies occurs when up to 1:5 DEAE-Dextran (W/W) was added to the double-stranded nucleic acid. Higher concentrations had a precipitative effect. This effect was suppressed when the addition was done in the presence of a 4 to 8 molar solution of urea. In this case, larger amounts of DEAE-Dextran can be added to the double-stranded nucleic acid and the enhancing properties of the complex are maintained.

In these reactions of polymerization, other polycations can be used instead of DEAE-Dextran, such as dimethylaminoethyl dextran, diethylaminoethyl dextran and other derivatives within the previously indicated range of molecular weights. Polymers of basically charged amino acids such as polyornithine and polyarginine or polylysine, basically charged natural proteins such as histones, protamines and lysozyme, and finally synthetic cationic polyelectrolytes such as hexadimethrine bromide can be used. The best early production (e.g., 4 days after inoculation) of antibodies was obtained by those polycations that are known antiheparin agents, such as hexadimethrine bromide, protamine sulfate and lysozyme. Four weeks after antigen inoculation, the maximum production of late antibodies was obtained by I:C complexed with protamine sulfate or polyarginine. In decreasing order of effectiveness are then listed polyornithine, lysozyme, DEAE-Dextran, histone, hexadimethrine bromide and polylysine. Polycations of molecular weight below $10^3$, such as spermine, harmine and neomycine, had no significant enhancing effect although they complexed readily with the nucleic acid double-strand.

Similarly, although hereinabove reference was made principally to the polymers of inosinic and cytidylic acids (I:C), other polynucleic acids — homopolymers or heteropolymers, such as those of adenine, uracil, xanthine, guanine, dihydrouracil (A,U X,G,DHU) or these polynucleotides and their copolymers, I and C, inclusive, such as A:U, A:I, or the partially dephosphorylated nucleotides such as CpA, CpU, CpC, and other nucleic acid analogs such as pyran copolymer, acrylic acid and methacrylic acid polymers, within a pH range situated between the isoelectric point of these polynucleotides and their degradation or dissociation point, can be used.

In general, the reactive products can be applied in their soluble form in the isotonic medium for the preparation of vaccines and injectable products for immunization purposes. They can, likewise, be incorporated into vaccine preparations, including those containing other adjuvants such as aluminum hydroxide, hydrated aluminum phosphate, sodium alginate, synthetic ion-exchange materials, or be incorporated into the water phase of water-in-oil emulsion vaccines.

Having now described a preferred embodiment, it is not intended that the invention be limited except as may be required by the appended claims.

I claim:

1. In a process for potentiating the antibody producing ability of nucleic acid containing preparations, the improvement comprising the incorporation therein of the product formed by reacting about 50 parts of a single-stranded or multi-stranded nucleic acid polymer with from 1 to 500 parts of a cationically charged polymer having a molecular weight between about $10^3$ and $10^8$ and being selected from the group consisting of protamine, histone and lysozyme, said parts being parts by weight, for inoculation into living animal hosts at doses ranging from about 1 to 5,000 micrograms of nucleic acid per kilo animal weight.

2. The process of claim 1 in which the molecular weight of said cationically charged polymer is between about $10^3$ and $10^6$.

3. The process of claim 1 wherein said nucleic acid polymer is selected from the group consisting of polyinosinic acid, polycytidylic acid, polyuridylic acid and polyadenylic acid.

4. In a process for potentiating the antibody producing ability of nucleic acid containing preparations the improvement comprising the incorporation therein of the product formed by reacting about 50 parts of a single-stranded or multi-stranded nucleic acid polymer with from 1 part to 500 parts of a cationically charged polymer having a molecular weight between about $10^3$ and $10^7$ and being selected from the group consisting of ornithine, lysine, citrulline, arginine, histidine and tryptophane, said parts being parts by weight, for inoculation into living animal hosts at doses ranging from about 1 to 5,000 micrograms of nucleic acid per kilo animal weight.

5. The process of claim 4 in which the molecular weight of said cationically charged polymer is between $10^4$ and $10^6$.

6. The process of claim 4 wherein said nucleic acid polymer is selected from the group consisting of polyinosinic acid, polycytidylic acid, polyuridylic acid and polyadenylic acid.

7. In a process for potentiating the antibody producing ability of nucleic acid containing preparations the improvement comprising the incorporation therein of the product formed by reacting about 50 parts of a single-stranded or multi-stranded nucleic acid polymer with from 1 to 500 parts of a cationically charged polymer of hexadimethrine bromide.

8. The process of claim 7 wherein said nucleic acid polymer is selected from the group consisting of polyinosinic acid, polycytidylic acid, polyuridylic acid and polyadenylic acid.

* * * * *